United States Patent [19]
Katsandres et al.

[11] Patent Number: 6,119,941
[45] Date of Patent: Sep. 19, 2000

[54] AUTOMATED HELP INSTRUCTIONS FOR AUTOMATICALLY OR ADAPTIVELY CONFIGURING A HAND-HELD DEVICE, SUCH AS A BAR CODE READER OR HAND-HELD PERSONAL COMPUTER

[75] Inventors: James T. Katsandres, Seattle; Chau Minh Ho, Edmonds, both of Wash.

[73] Assignee: Intermec Ip Corp., Beverly Hills, Calif.

[21] Appl. No.: 09/072,948

[22] Filed: May 4, 1998

[51] Int. Cl.⁷ .................................................. G06K 7/10
[52] U.S. Cl. ........................ 235/462.07; 235/462.08; 235/472.01
[58] Field of Search .................. 235/462.07, 462.15, 235/462.25, 462.08, 472.01, 383

[56] References Cited

U.S. PATENT DOCUMENTS

| | | | |
|---|---|---|---|
| 4,992,940 | 2/1991 | Dworkin | 235/383 |
| 5,294,782 | 3/1994 | Kumar | 235/472.01 |
| 5,326,961 | 7/1994 | Sibata | 235/462.07 |
| 5,329,104 | 7/1994 | Ouchi et al. | 235/462.07 |
| 5,414,252 | 5/1995 | Shinoda et al. | 235/462.07 |
| 5,468,946 | 11/1995 | Oliver | 235/462.07 |
| 5,481,098 | 1/1996 | Davis et al. | 235/462.07 |
| 5,536,930 | 7/1996 | Barkan et al. | 235/472.01 |
| 5,756,981 | 5/1998 | Roustaei et al. | 235/462.07 |
| 5,914,476 | 6/1999 | Gerst, III et al. | 235/462.07 |
| 5,929,418 | 7/1999 | Ehrhart et al. | 235/462.27 |
| 6,032,128 | 2/2000 | Morrison | 235/383 X |

*Primary Examiner*—Michael G Lee
*Assistant Examiner*—Diane I. Lee
*Attorney, Agent, or Firm*—Perkins Coie LLP

[57] ABSTRACT

The invention provides a method and system for guiding a hand-held device operator through the process of enabling input and output devices on the hand-held device. In one exemplary embodiment of the invention, a hand-held device includes a bar code reader which images or scans a bar code label. The hand-held device then searches its enabled bar code symbologies for a bar code symbology which interprets the scanned bar code label. If the device cannot interpret the scanned bar code label according to its presently enabled bar code symbologies, the device then examines its non-enabled bar code symbologies. If the scanned bar code label can be interpreted according to a non-enabled bar code symbology, then the device queries the operator to determine if the bar code symbology should be enabled. If the operator requests enablement of the bar code symbology, then the device changes the bar code symbology to an enabled status and interprets the scanned bar code label according to the newly enabled bar code symbology. Otherwise, the device generates an error message and sends it to the operator. Other embodiments of the invention permit the enablement of input devices such as touch-sensitive screens, keyboards, and operator-selectable input buttons.

56 Claims, 11 Drawing Sheets

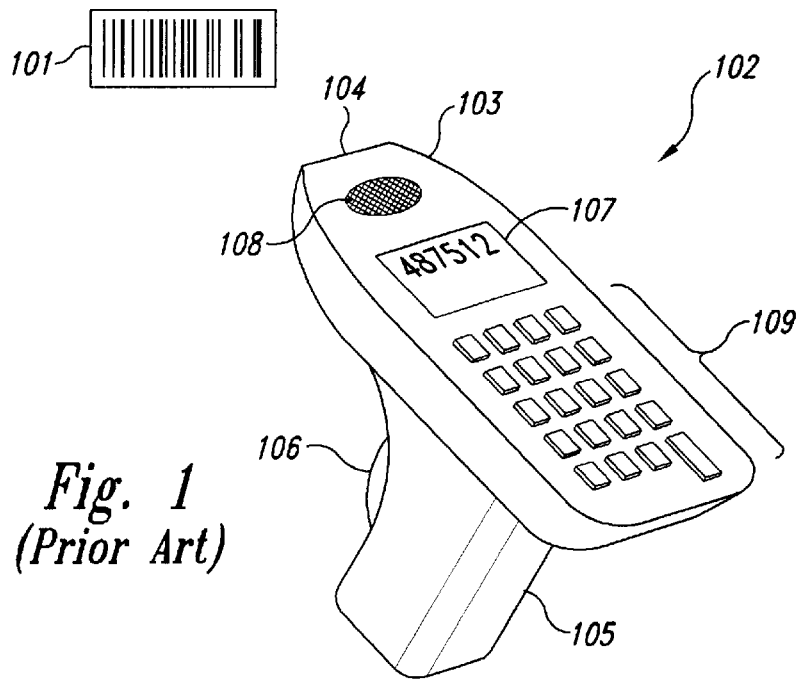
Fig. 1
*(Prior Art)*
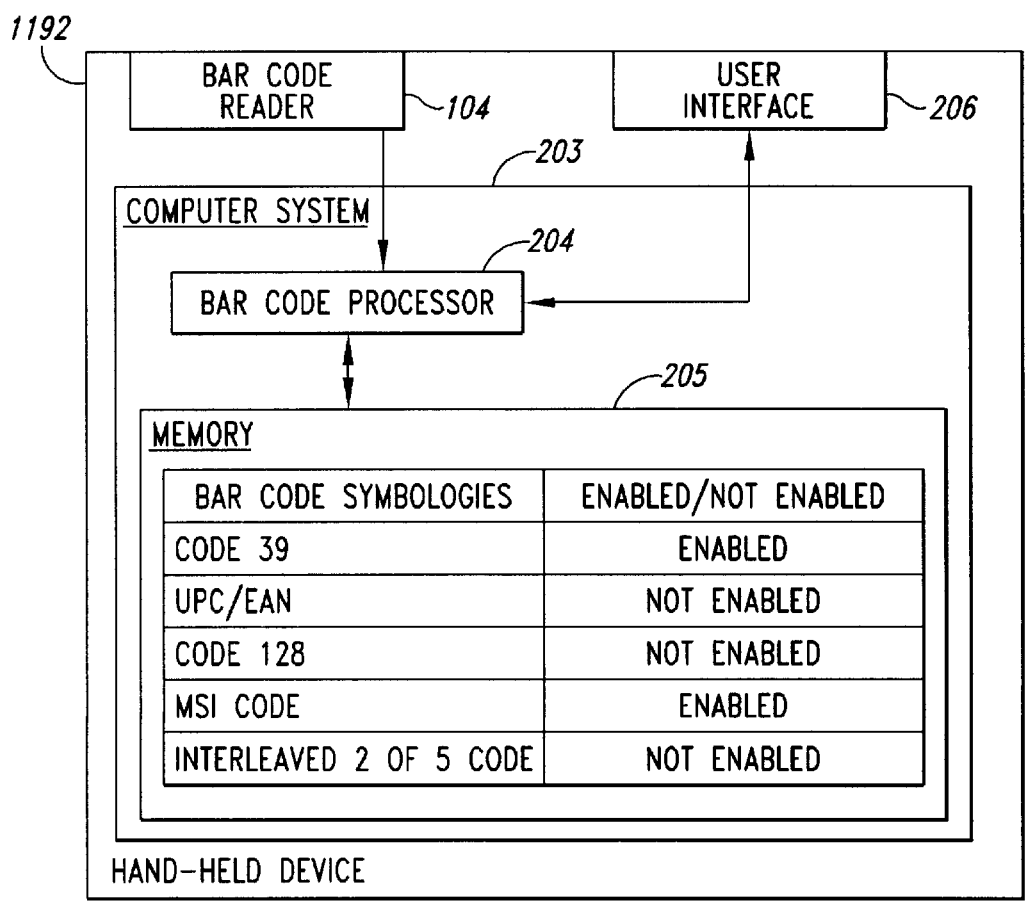
Fig. 2 *(Prior Art)*

THE INPUT DATA CANNOT BE IDENTIFIED ACCORDING TO ANY ENABLED BAR CODE SYMBOLOGIES. HOWEVER, THE INPUT DATA CAN BE IDENTIFIED ACCORDING TO THE CODE 39 SYMBOLOGY. SHOULD THE CODE 39 SYMBOLOGY BE ENABLED? Yes/No

*Fig. 7A*

THE INPUT DATA CANNOT BE IDENTIFIED ACCORDING TO ANY ENABLED BAR CODE SYMBOLOGIES. SHOULD I EXAMINE NON-ENABLED SYMBOLOGIES?
Yes        No

*Fig. 7B*

WHICH OTHER SYMBOLOGIES SHOULD I EXAMINE?
[PICK ALL THAT APPLY]
○ NON-ENABLED SYMBOLOGIES ON THIS DEVICE
○ SYMBOLOGIES EXTERNAL TO THIS DEVICE
(CANCEL)

*Fig. 7C*

AUTOMATED HELP INSTRUCTIONS FOR AUTOMATICALLY OR ADAPTIVELY CONFIGURING A HAND-HELD DEVICE, SUCH AS A BAR CODE READER OR HAND-HELD PERSONAL COMPUTER

TECHNICAL FIELD

The invention relates generally to hand-held devices and more particularly to systems for guiding operators of such devices through the process of enabling a device's operating parameters and other operator-selectable features.

BACKGROUND OF THE INVENTION

Hand-held devices, such as those equipped with bar code readers, have received increasing commercial attention in the past few years. Hand-held devices, such as hand-held data collection terminals or hand-held personal computers, have been widely implemented in the retail marketplace and have garnered increasing utilization in a diverse range of application areas. The ever-decreasing cost and size of hand-held devices has facilitated their entry into a wide variety of businesses, institutions, and agencies.

A hand-held device having a bar code reader adeptly accesses and retrieves data stored in the form of a bar code label. Data representing virtually any product or service found in the marketplace may be encoded in a bar code label for later access by a hand-held device having a bar code reader. For these reasons, hand-held devices are now actively used for planning, controlling, producing, and analyzing most aspects of commerce.

FIG. 1 illustrates a representative hand-held device 102 and a bar code label 101. The data encoded in the bar code label 101 may be read or accessed by the hand-held device 102 through its bar code reader 104. In this representative example, the hand-held device 102 comprises two major components, a body 103 and a handle 105. The front end of the body 103 houses the bar code reader 104. The handle 105 includes a trigger 106 through which a device operator initiates scanning or imaging of a bar code label, such as the bar code label 101. Bar code readers include laser scanners as well as other means such as a still camera. If the imaging succeeds, then the data encoded in the bar code label 101 will be presented in an alphanumeric form on a screen 107 of the hand-held device 102. In addition, an audible beep will typically be generated through a speaker 108 as the result of a successful imaging. The hand-held device 102 also includes a keyboard 109 through which the device operator may input additional information to the device.

Bar code symbologies suitable for scanning or imaging exist in a variety of types. Linear symbologies, such as the bar code label 101, are symbols where data is encoded as parallel arrangements of alternating, multiple-width bars and spaces (e.g., UPC, Code 39, Code 93, etc.). Stacked symbologies or multi-row symbologies, employ several adjacent rows of multiple-width bars and spaces (e.g., Code 49, PDF417, etc.). Area symbologies, or two dimensional matrix symbologies, employ arrangements of regular polygon-shaped data cells where the center-to-center distance of adjacent data cells is uniform (e.g., MaxiCode, Code One, Data Matrix, Aztec Code, etc.). As used generally herein, a bar code symbol refers to a symbol from any of the linear, stacked, area and other machine-readable symbologies.

A hand-held device, such as the hand-held device 102 in FIG. 1, may access any type of bar code data, so long as the hand-held device has access to the particular bar code symbology used to encode the scanned or imaged bar code data. A hand-held device typically accesses the bar code symbologies stored in its memory which have been placed in an enabled status. The enabled status for a bar code symbology indicates that the bar code symbology actively serves as a reference against which scanned or imaged bar code data may be compared.

Enabling a bar code symbology on a hand-held device may entail, for example, making the hand-held device aware of the start and stop characters for the symbology. A typical linear symbology contains "start and stop" characters, which are unique to the given symbology and indicate the beginning and end of a given symbol, respectively. Thus, the hand-held device may identify the symbology for imaged or scanned bar code data by comparing its start and stop characters against the start and stop characters of the enabled bar code symbologies on the hand-held device. A typical hand-held device may also have non-enabled bar code symbologies stored in its memory, as well as a means for altering the enablement/non-enablement status of the bar code symbologies stored in the device's memory.

FIG. 2 provides a block diagram of a conventional hand-held device equipped for accessing data encoded in bar code labels. Hand-held device 102 contains a bar code reader 104. The bar code reader 104 images or scans a bar code label and then provides the imaged or scanned bar code data to a computing system 203 for processing. Within the computing system 203, a bar code processor 204 receives the imaged or scanned bar code data from the bar code reader 202. The bar code processor 204 then examines the bar code symbologies presently stored in a memory 205 which the device operator has placed in an "enabled" state. The exemplary memory 205 shown in FIG. 2 contains the bar code symbologies for Code 39, the UPC/EAN Code, Code 128, the MSI Code, and the Interleaved 2 of 5 Code. As shown in this figure, Code 39 and the MSI code have been enabled, while the device operator has not placed the UPC/EAN Code, Code 128, and the Interleaved 2 of 5 Code in an enabled state.

Once the bar code processor 204 identifies the enabled bar code symbology in which the imaged or scanned bar code data has been encoded, then the bar code processor 204 determines the alphanumeric representation for the imaged or scanned bar code data according to the identified bar code symbology. The bar code processor 204 then indicates to the device operator, through a user interface 206, that a correct scan or image has been performed. In a typical hand-held device, a specific audible tone typically indicates a correct scan or image. If the bar code processor 204 cannot identify an enabled bar code symbology which characterizes, or identifies, the imaged or scanned bar code data, then the bar code processor 204 indicates to the device operator, through the user interface 206, that the imaged or scanned bar code data has not been identified.

FIG. 3 provides a flowchart of the typical bar code label imaging or scanning process using a hand-held device 102. In the typical bar code label imaging or scanning process, a bar code reader 104 images or scans a bar code label 101 and provides the imaged or scanned bar code data to a bar code process or bar code processor 204 (step 301). The bar code processor 204 determines whether the imaged or scanned bar code data can be identified according to an enabled bar code symbology in the hand-held device 102 (step 302). In a typical hand-held device 102, if an enabled bar code symbology cannot be identified, the device operator receives an error message stating that the imaged or scanned bar code data could not be identified (step 303). Error algorithms in hand-held devices typically operate at low levels within the device, levels which are inaccessible and generally hidden from the device operator. If the imaged or scanned bar code data can be identified according to an enabled bar code symbology, then the bar code processor 204 translates the scanned bar code label into its alphanumeric representation according to the identified bar code symbology (step 304). Finally, the bar code processor 204 provides an identification, such as a beep, to the device operator that the imaged or scanned bar code data has been identified (step 305).

In some hand-held devices, a bar code reader 104 images or scans a bar code label multiple times before concluding that the imaged or scanned bar code data cannot be identified. Under this voting approach, multiple images or scans of a bar code label permit a bar code symbology to be identified as the "winner" of the voting mechanism. In other words, the bar code reader 104 images or scans the bar code label multiple times, and the bar code processor 204 picks the winning bar code symbology by determining which bar code symbology has been most frequently identified during the multiple images or scans. For example, an error message (step 303) also results when the imaged or scanned bar code data can be identified according to more than one bar code symbology and the bar code processor 204 cannot identify a "winning" bar code symbology. Multiple images or scans of the same bar code label may resolve errors caused by the material upon which the bar code label has been printed, the bar code label itself, or even with the bar code reader. For example, the bar code label may have been printed on a material which is not conducive to imaging or scanning or the bar code label may be encrusted with dust or dirt which interfere with obtaining a successful image or scan of the bar code label.

FIG. 4 provides a graphic depiction of the bar code label imaging or scanning procedure in a conventional bar code reading system. A bar code label 401 contains data which has been encoded in the Code 39 symbology. A bar code reader 104 of a hand-held device 102 images or scans the bar code label 401, creating imaged or scanned bar code data which exists within the hand-held device 102 in electronic form and represents the data recorded in the bar code label. The hand-held device 102 contains three enabled bar code symbologies 403: the UPC/EAN code, the MSI code, and Code 128. Because the Code 39 symbology has not been enabled in the bar code reader 104, the data represented by the bar code label 401 cannot be identified. Under these conditions, a device operator 404 does not receive a signal, such as the customary auditory beep, indicating a correct reading of the bar code label 401. In such circumstances, the hand-held device 102 typically outputs a written error message to the device operator 404 stating that the bar code label 401 could not be identified.

During the imaging or scanning procedure, the typical hand-held device operator 404 does not look at the screen on the hand-held device (e.g., at the screen 107 shown in FIG. 1). The typical device operator 404 merely listens for an auditory beep such as that produced by the speaker 108 shown in FIG. 1. In response to the error message, or in response to the absence of a successful image or scan signal, the device operator 404 may re-image or re-scan bar code label 401. However, since the Code 39 symbology has not been enabled in the hand-held device 402, an incorrect image or scan should again result.

After several unsuccessful images or scans of bar code label 401, device operator 404 will typically assume one of three reasons for the unsuccessful image or scan. The device operator 404 may conclude that the bar code label 401 has been encoded in a bar code symbology which has not been enabled for this hand-held device. The device operator may instead conclude that bar code label 401 contains a defect which prevents a successful imaging or scanning. The device operator 404 may even conclude that the hand-held device 102 has malfunctioned.

Imaging or scanning a bar code label containing intrinsic defects such as those mentioned above, should always result in an erroneous image or scan. Imaging or scanning a bar code label which has been encoded in a bar code symbology which has not been enabled on the imaging or scanning device also results in an erroneous image or scan. However, an erroneous imaging or scanning arising due to non-enablement of a bar code symbology can be resolved by simply enabling the bar code symbology which represents the scanned bar code label. Unfortunately, enabling multiple bar code symbologies on a hand-held device runs counter to a widely accepted method for lowering the probability of misidentifying a bar code label by selecting an inappropriate bar code symbology.

When only a few bar code symbologies (i.e., a single bar code symbology) are enabled on a hand-held device, the intrinsic error conditions will typically produce an incorrect image or scan. In response, the device operator simply re-images or re-scans the bar code label to obtain a correct reading, assuming the particular errors are of limited severity. However, when multiple bar code symbologies have been enabled, the hand-held device will examine the possibility that each of the enabled bar code symbologies could be the bar code symbology in which the bar code label has been encoded. Thus, as the number of enabled bar code symbologies increases, so does the probability of obtaining an error due to a "false positive" identification of a bar code label. In other words, enabling multiple bar code symbologies increases the chance that a bar code label encoded in one bar code symbology will be incorrectly identified as having been encoded in another bar code symbology rather than as an erroneous and unidentifiable bar code image or scan. For example, under certain error conditions, scanned data for a bar code label encoded in a Code 39 bar code symbology may be incorrectly identified as having been encoded in the UPC/EAN code. If the UPC/EAN code has not been enabled on the particular hand-held device receiving this imaged or scanned bar code data, then the hand-held device will properly generate an error message (because the hand-held device will have no opportunity to mischaracterize the scanned data). On the other hand, if the UPC/EAN code has been enabled on this hand-held device, then the imaged or scanned bar code data will be incorrectly characterized according to the UPC/EAN code. In order to reduce the possibility of this type of error, hand-held device manufacturers typically encourage device operators to limit the number of enabled bar code symbologies on their devices.

Over time, the number of bar code symbologies has grown and will most likely continue to grow. Rather than honing in on a few bar code symbologies, which then become the industry standards, the bar code industry has experienced unbounded growth in the number of bar code symbologies. The continued growth in new bar code symbologies arises for two main reasons. First, continued improvements in the fidelity of bar code readers has enabled the development of increasingly dense bar code symbologies which store more information in a given area than earlier bar code symbologies. In addition, the increasing acceptance of bar code symbologies has allowed bar code technology to flourish in industries and markets in which this technology was not previously known. These new markets have tended to develop bar code symbologies particularly adapted for encoding data germane to their respective markets, rather than adopting a pre-existing bar code symbology. For these reasons, the number of bar code symbologies has grown over time. Industry analysts believe the number of bar code symbologies will continue to increase in the future.

As a result of the continued growth of bar code technology, hand-held devices having bar code readers must accommodate, in one fashion or another, ever increasing numbers of bar code symbologies. However, accommodating new bar code symbologies is more complicated than merely acquiring additional memory for storing the new bar code symbologies. As discussed above, increasing the number of enabled bar code symbologies in a hand-held device runs counter to the widely accepted procedure for reducing the probability of a false positive error when imaging or scanning a bar code label. If a typical bar code processor cannot locate an enabled bar code symbology in which imaged or scanned bar code data has been expressed, then the bar code processor indicates to the device operator, through a user interface, that an incorrect image or scan has occurred.

In a typical operating environment, the device operator frequently only works with data encoded in one particular bar code symbology and may, in fact, never utilize data encoded in any other bar code symbology. Thus, in some operating environments, even if a set of imaged or scanned bar code data could be expressed properly in a Code 128 symbology, for example, it would always be an error to characterize the imaged or scanned bar code data according to Code 128 because the imaged or scanned bar code data for this particular environment is always encoded according to the Code 39 symbology. Conventional hand-held devices have been designed with this environment in mind.

On the other hand, other operating environments exist where a hand-held device may image or scan bar code data which has been encoded in a variety of bar code symbologies. In such environments, the device operator may forget, or simply not know, that multiple bar code symbologies may be encountered. In addition, a hand-held device may be moved from one environment where the bar code labels are always of one type (e.g., Code 128) to another environment where the bar code labels are always of another type (e.g., Code 39). If the device operator in the new environment does not know to enable the proper bar code symbology for this environment, then no bar code labels will be properly identified in the new environment.

Hand-held devices are primarily intended for technically unsophisticated operators. The typical hand-held device operator has neither adequate training nor a rudimentary understanding of the basic principles upon which the hand-held device operates, compounding the practical limitations of the conventional hand-held device. Consequently, if a typical device operator begins imaging or scanning bar code data which has been encoded in a non-enabled symbology, the device operator may conclude that the hand-held device has malfunctioned. Repeated erroneous images or scans of a bar code label may, in fact, reinforce the device operator's impression that the hand-held device has broken down. Such a situation may arise in a variety of circumstances. For example, the device operator may encounter a bar code label which has been encoded in a bar code symbology which is not typical of the bar code symbologies heretofore scanned by the operator's hand-held device. This type of bar code symbology will frequently not be enabled on the device operator's hand-held device and may well not even be stored in memory on the hand-held device. This problem may also arise when a device operator receives a new hand-held device which has been transferred from another area, such as another division of his company, and this new hand-held device does not contain the device operator's typical set of enabled bar code symbologies.

As discussed above, only a few industries have bar code standards, although particular industries, such as the health care industry, have adopted standards. However, even in the health care industry, a given hospital may maintain both a blood collection program operating under the health care industry standard and a supply warehouse operating under a commercial standard. Thus, it is quite common for more than a single bar code symbology to be used in the same location, even when the bar code labels conform to industry standards. In such an environment, the hand-held device may not operate properly when moved from one internal location to another, unless the device operator knows to enable a new set of bar code symbologies.

The relative unsophistication of the typical hand-held device operator coupled with the dearth of user information typically provided with or by hand-held devices results in many properly operating hand-held devices being returned to the manufacturer as defective. Some manufacturers have found that fully half of the hand-held devices returned to them as defective, in fact, contain no defects at all. For example, a device operator may have made multiple images or scans of a bar code label expressed in a bar code symbology not enabled on the hand-held device. After repeated failures at imaging or scanning the bar code label, the device operator then concludes that the device has malfunctioned and sends it back to the manufacturer for repair. In reality, the hand-held device works properly, and the device operator has merely scanned a bar code label expressed in a bar code symbology which was not enabled on that particular device. As shown in FIG. 2, a bar code symbology may, in fact, be stored on the hand-held device but just not presently enabled. Hand-held device manufacturers are understandably eager to reduce the number of hand-held devices returned to them as inoperable which are, in fact, in proper working condition.

This paradigm of a hand-held device not appearing to function properly can also arise with other inputs and outputs to the device. For example, a particular input key on the hand-held device may not be presently enabled but could be enabled by selecting a parameter within the device representing the input key. In fact, a hand-held device may have numerous input and output devices whose parameters do not have an enabled status. This situation arises more and more frequently as hand-held devices continue to be utilized in new areas. Features provided for operations in one environment may not be normally needed in another environment, so these features are disabled. However, if the hand-held device is moved to another environment, the disabled features may become quite useful and should be enabled.

SUMMARY OF THE INVENTION

Embodiments of the invention provide a method and system for guiding a hand-held device operator through the process of enabling various operator-selectable parameters on a hand-held device. When the hand-held device determines that the device operator has attempted to engage an operator-selectable parameter not presently enabled, the hand-held device informs the device operator that the particular parameter has not been enabled. The hand-held device then presents the device operator with appropriate courses of action, including the option of enabling the device parameter. The hand-held device then queries the device operator as to which option should be undertaken. If the device operator replies that the device parameter should be enabled, then the hand-held device enables the device parameter and undertakes the action which would have been performed had the device parameter been enabled when the device operator first attempted to engage the device parameter. If the device operator selects another option, then the hand-held device performs the appropriate steps for that option. Embodiments of the invention find application in the process of locating and enabling bar code symbologies not presently enabled on a hand-held device, as well as with other operator-selectable input and output device parameters on a hand-held device.

BRIEF DESCRIPTION OF THE DRAWINGS

Note that similar elements and steps in the figures have the same reference number.

FIG. 1 illustrates a representative hand-held device and a bar code label.

FIG. 2 provides a block diagram of the hand-held device of FIG. 1 equipped for accessing data encoded in the bar code label.

FIGS. 7A, 7B, and 7C together illustrate messages which a device operator may receive according to an exemplary embodiment of the present invention.

DETAILED DESCRIPTION OF THE INVENTION

Figure 3:
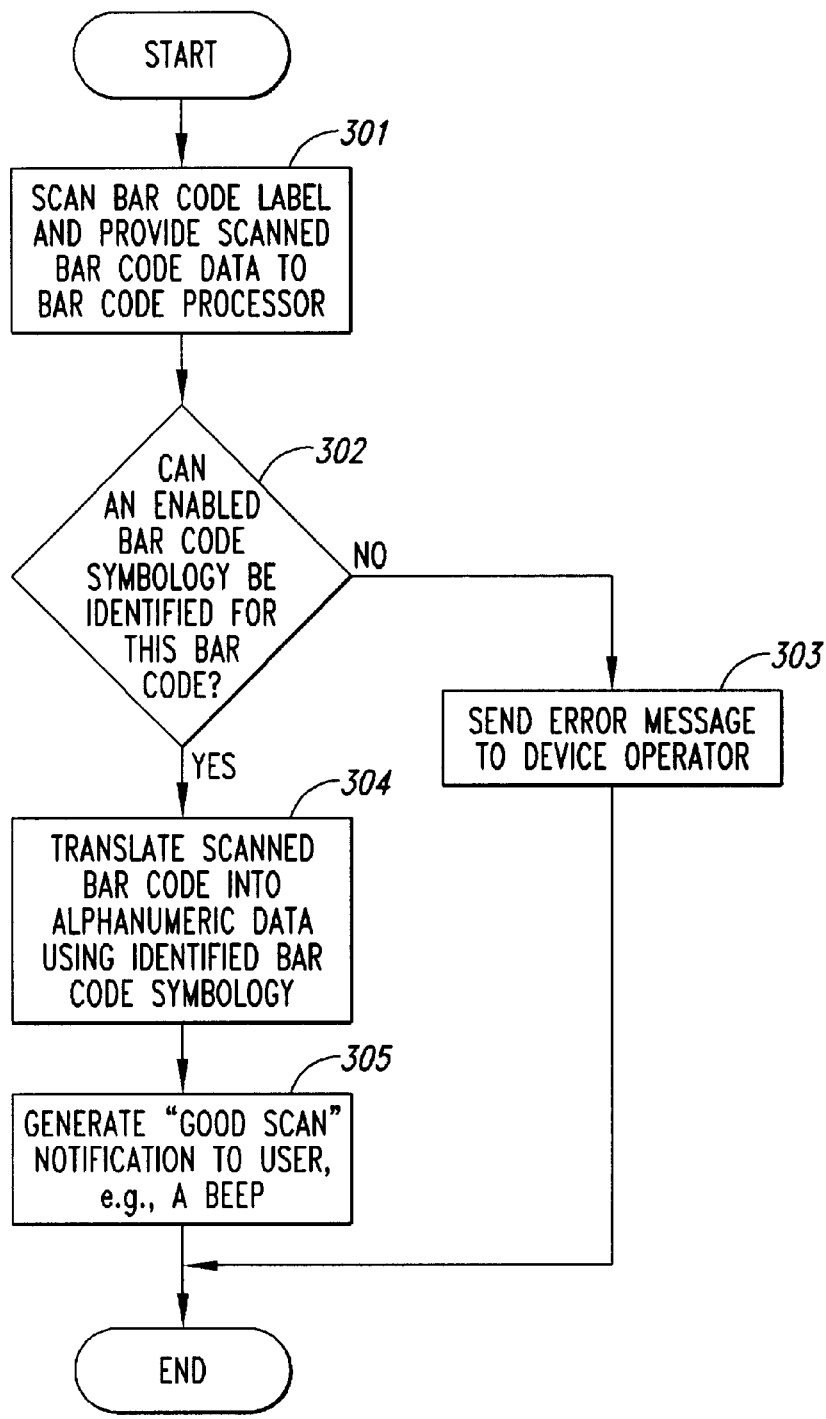
FIG. 3 provides a flowchart of the typical bar code label imaging or scanning process using the hand-held device of FIG. 1.
Figure 4:
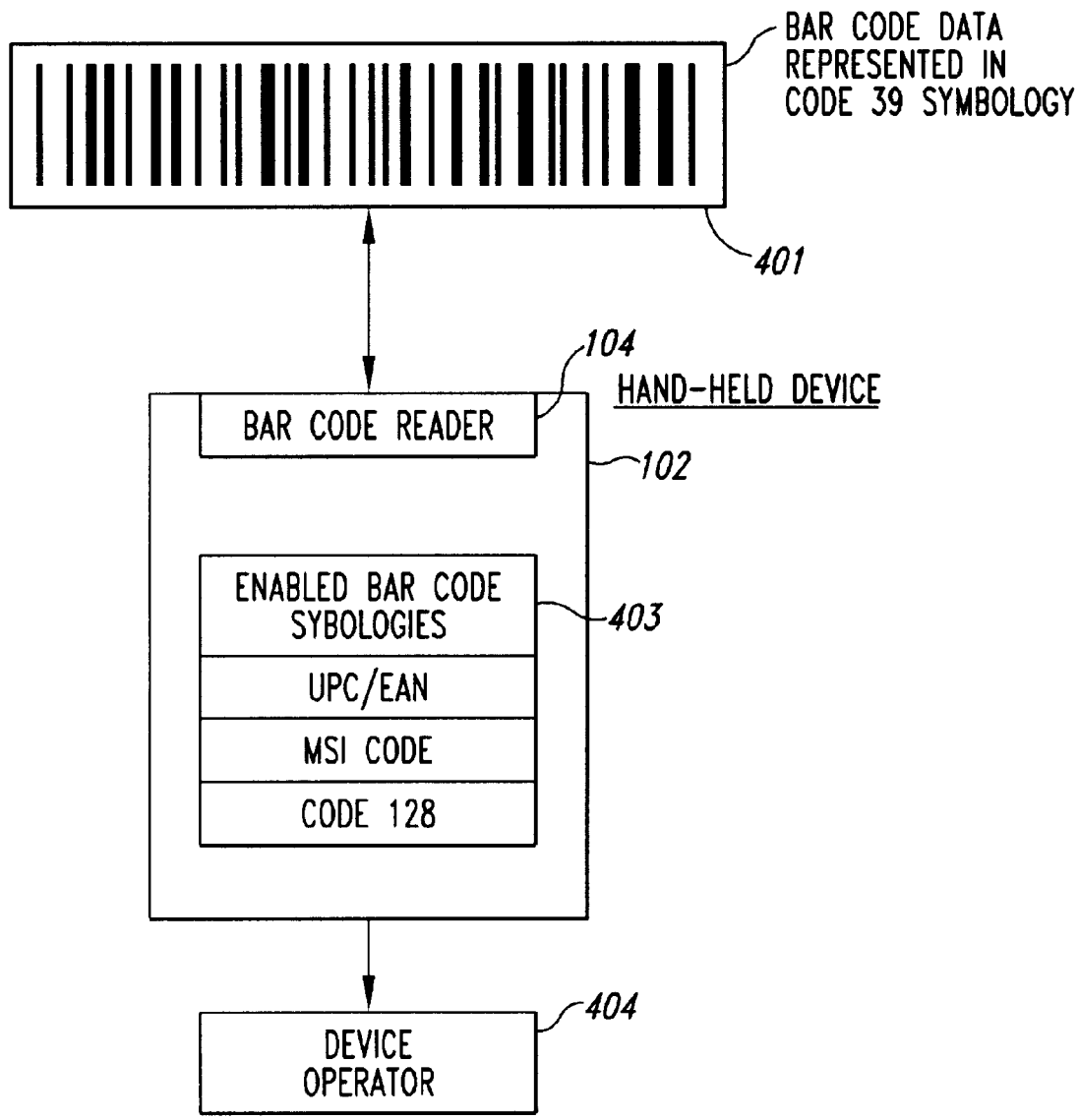
FIG. 4 provides a block diagram of the bar code label imaging or scanning procedure in a conventional bar code reading system.

Embodiments of the invention provide a method and system for guiding a hand-held device operator through the process of enabling input and output device parameters, such as enabling a bar code symbology. The hand-held device first receives a request to access an input or output device which has not been enabled. The hand-held device notifies the device operator that a non-enabled device has been accessed. The hand-held device then queries the device operator whether the non-enabled device should be enabled. If the device operator provides an affirmative response, then the hand-held device enables the device. If the device operator provides a negative response, then the hand-held device either generates an error message or ignores the initial request to access the device, as appropriate.

The invention arises from the inventors' discovery that because the bar code processor in a conventional hand-held device only searches the enabled bar code symbologies on the device, the device operator receives insufficient status information with which to make an informed decision regarding the failure of an imaging or scanning procedure. For example, using the bar code symbologies shown in the exemplary memory 205 of FIG. 2, if the data from a scanned or imaged bar code label could be expressed according to the Code 128 symbology, the bar code processor 204 would never examine the possibility that the scanned or imaged bar code label could have been expressed in Code 128 since this bar code symbology has not been enabled on this hand-held device. Accordingly, the hand-held device would also not inform the device operator that the scanned or imaged bar code data could be expressed in the Code 128 symbology. The failure to report this vital information to the device operator thwarts successful utilization of the hand-held device and may even lead to the device being returned to the manufacturer as defective. Thus, the inventors have realized that helping a device operator determine which features of a device have been enabled and which features have not been enabled aids the device operator in optimizing the performance of the hand-held device and reduces the number of properly operating devices returned to the manufacturer for repair.

The inventors have likewise discovered that hand-held device operators receive insufficient status information with regard to many other input and output capabilities on a conventional hand-held device. Leaving parameter enablement choices solely to the device operator's initiative and understanding of the device's operations does not generally lead to more effective utilization of the device. Automatically enabling all operator-selectable parameters on a hand-held device also does not enhance the device's operations. Thus, the invention provides a middle ground between enablement of all hand-held device parameters and enablement based upon a device operator's initiative.

The following provides an illustrative example of an embodiment of the invention. A hand-held device operator uses a device's bar code reader to image or scan a bar code label. The hand-held device cannot identify the bar code data produced by imaging or scanning the bar code label according to any of the presently enabled bar code symbologies. The hand-held device next compares the imaged or scanned bar code data to the particular non-enabled bar code symbologies on the device and identifies a particular non-enabled bar code symbology which characterizes the scanned or imaged bar code data. The hand-held device then provides a status report to the device operator, explaining that the imaged or scanned bar code data can only be recognized according to a non-enabled bar code symbology. The hand-held device identifies the non-enabled bar code symbology which characterizes the imaged or scanned bar code data, and queries the device operator whether the non-enabled bar code symbology should be enabled on this device. If the device operator provides an affirmative reply, then the hand-held device sets the particular bar code symbology to an enabled status. On the other hand, if the device operator replies in the negative, then the hand-held device sends the device operator an error message stating that the imaged or scanned bar code data could not be characterized according to any of the enabled bar code symbologies.

Figure 5:
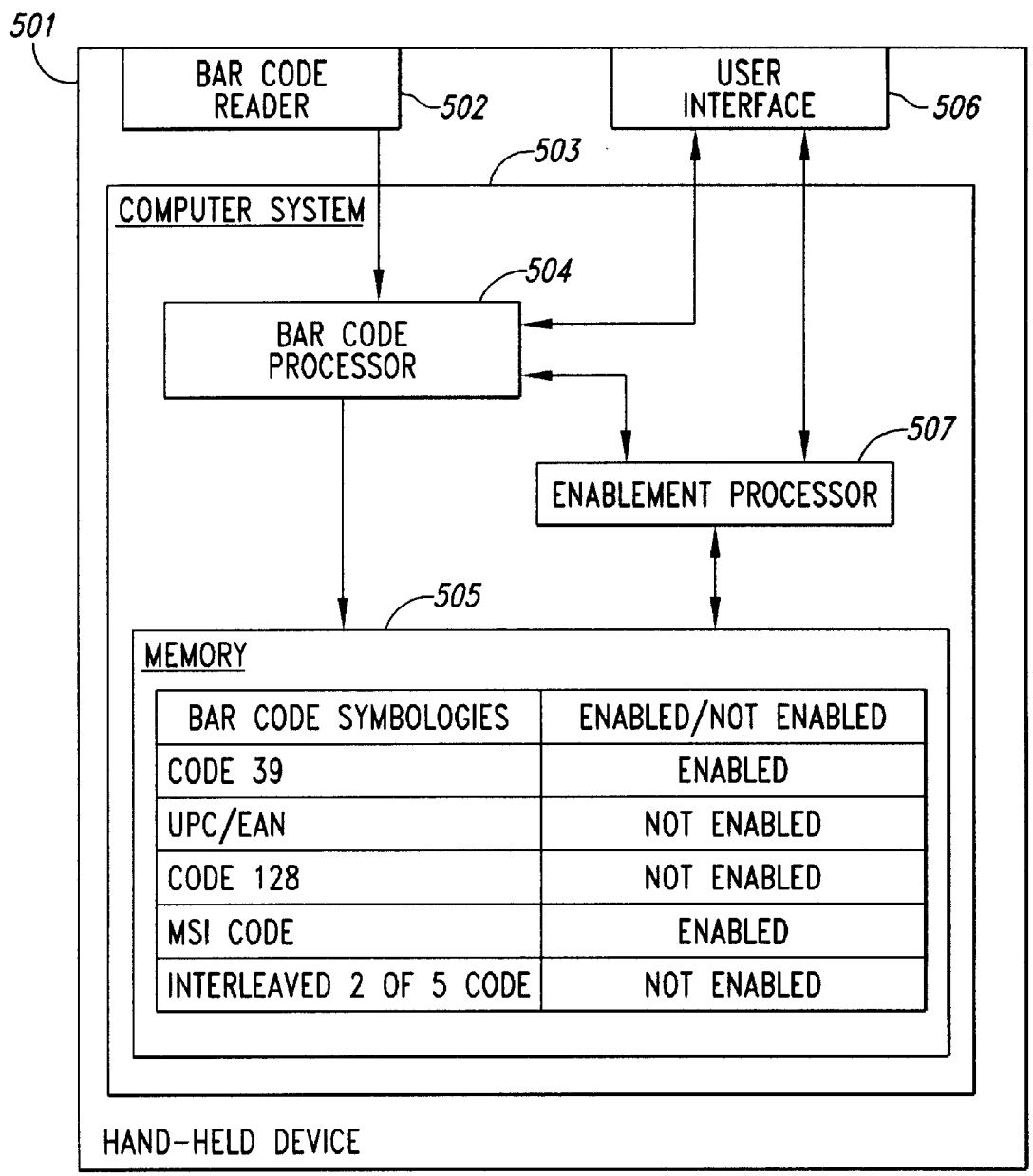
FIG. 5 provides a block diagram of a hand-held device according to an exemplary embodiment of the invention.

FIG. 5 provides a block diagram of a hand-held device according to an exemplary embodiment of the invention. Hand-held device 501, as shown in FIG. 5, comprises a bar code reader 502, a user interface 506 (including, e.g., a display screen), and a computer system 503 which contains a bar code processor 504, a memory 505, and an enablement processor 507. To retrieve the data stored in a given bar code label, the bar code reader 502 images or scans the bar code label to produce imaged or scanned bar code data. The bar code reader 502 provides the imaged or scanned bar code data to the computing system 503. The bar code processor 504, within the computing system 503, receives the imaged or scanned bar code data. The bar code processor accesses the memory 505 in an effort to identify the bar code symbology in which the imaged or scanned bar code data has been encoded. The bar code processor 504 only examines the bar code symbologies having an enabled status. In the representative example provided in FIG. 5, memory 505 contains enabled bar code symbologies for Code 39 and the MSI code. Memory 505 also contains non-enabled bar code symbologies for the UPC/EAN code, Code 128, and the Interleaved 2 of 5 Code. A device operator may consciously change a given bar code symbology's enabled/non-enabled status at any time through the user interface 506.

If a bar code label which has been scanned by the bar code reader 502 and provided to the bar code processor 504 can be identified according to an enabled bar code symbology, then the bar code processor 504 interprets the imaged or scanned bar code data, using the identified bar code symbology, and translates the imaged or scanned bar code data into its corresponding alphanumeric form. The bar code processor 504 then provides an indication to the device operator, through the user interface 506, that the imaged or scanned bar code data has been correctly identified, or properly scanned and recognized.

If the bar code reader 502 images or scans a bar code label which bar code processor 504 cannot characterize according to any of the enabled bar code symbologies, then the enablement processor 507 attempts to characterize the imaged or scanned bar code data using the non-enabled bar code symbologies resident in the memory 505, as explained in more detail below. If the imaged or scanned bar code data can be characterized according to one or more of the non-enabled bar code symbologies, then the enablement processor 507 generates a message to the device operator through the user interface 506. The message generated to the device operator by the enablement processor 507 first informs the device operator that the imaged or scanned bar code data cannot be characterized according to any of the enabled bar code symbologies. The message then states that the imaged or scanned bar code data can be characterized according to one or more particular bar code symbologies which have not been enabled on the hand-held device 501. The enablement processor 507 then queries the device operator whether one of the non-enabled bar code symbologies should have an enabled status in the memory 505 of the hand-held device 501.

If the device operator provides an indication back to the enablement processor 507, through the user interface 506, that the device operator wishes the particular non-enabled symbology to become an enabled symbology, then the enablement processor 507 enables this bar code symbology. On the other hand, if the device operator indicates to the enablement processor 507, through the user interface 506, that the device operator does not wish the identified bar code symbology to become an enabled symbology, then the enablement processor 507 provides an indication to the bar code processor 504 that the bar code image or scan has resulted in an error. The bar code processor 504 may then undertake its normal steps in informing the device operator that an error has occurred. As previously discussed, the device operator may not want a particular bar code symbology enabled because the device operator may know that the imaged or scanned bar code data must be characterized according to the set of bar code symbologies which have already been enabled on this hand-held device. On the other hand, if the device operator does wish to enable a non-enabled symbology, then this embodiment of the invention presents the operator with the option of enabling a presently non-enabled bar code symbology.

Figure 6:
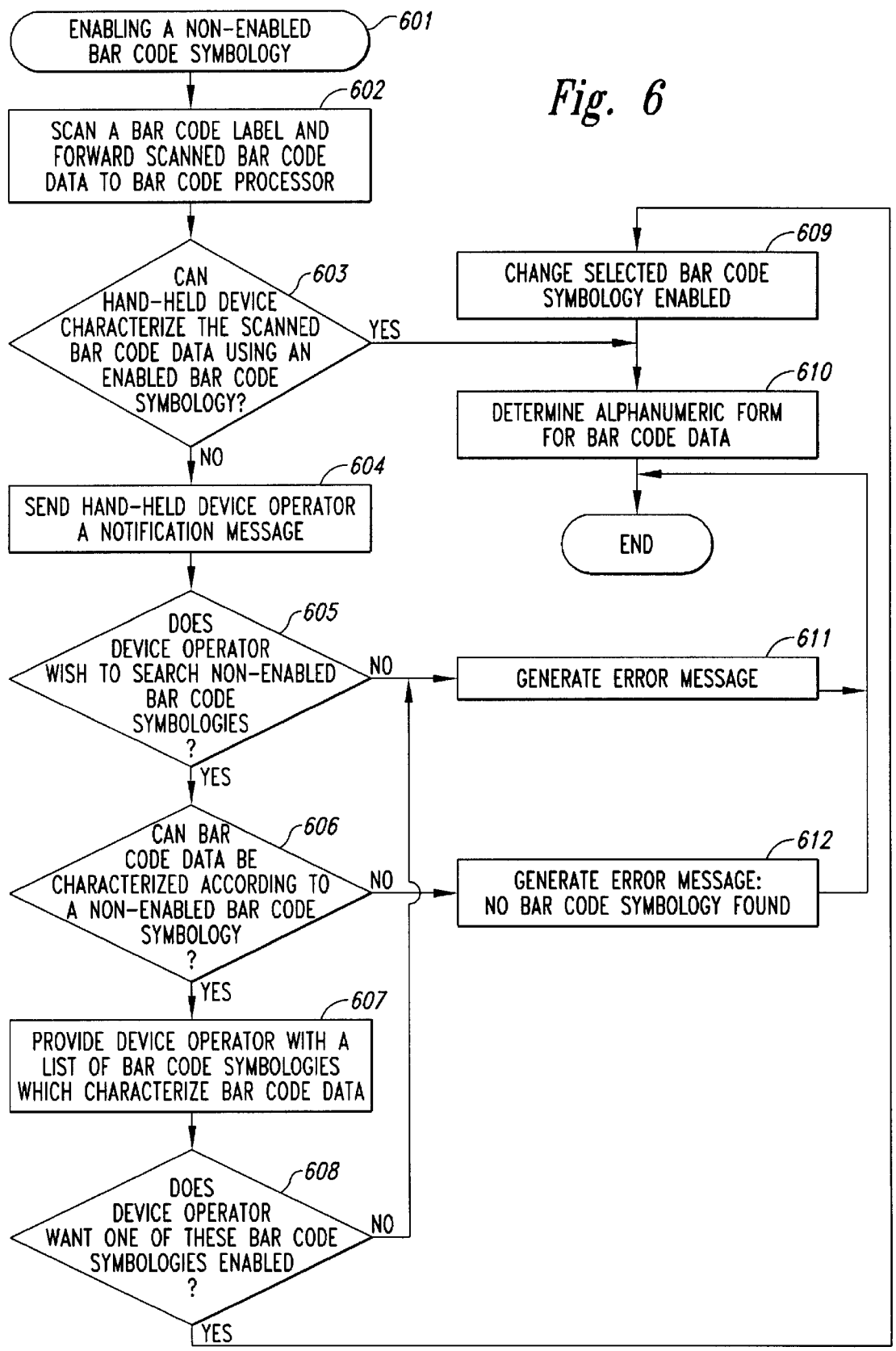
FIG. 6 provides a flow diagram depicting a method used in the exemplary embodiment to enable a non-enabled bar code symbology.

FIG. 6 provides a flow diagram depicting the method used in an exemplary embodiment of the invention to enable a non-enabled bar code symbology. The bar code reader 502 images or scans a bar code label and forwards the imaged or scanned bar code data to the bar code processor 504 (step 602). The bar code processor 504 determines whether the hand-held device 501 has been configured to characterize the data represented by the imaged or scanned bar code data (step 603). If the bar code processor 504 can characterize the imaged or scanned bar code data according to an enabled bar code symbology, then the bar code processor 504 determines the alphanumeric form representing the imaged or scanned bar code data according to the identified bar code symbology (step 610).

If the bar code processor 504 cannot identify the imaged or scanned bar code data according to an enabled bar code symbology, then the bar code processor 504 generates a notification message to the device operator (step 604). For example, hand-held device 501 may provide a particular audible sound and display on the display screen of the user interface 506 a message such as: "The data input cannot be identified according to any of the presently enabled bar code symbologies." The enablement processor 507 queries the device operator as to whether the device operator wishes a search to be undertaken to determine if the imaged or scanned bar code data could be characterized according to a presently non-enabled bar code symbology (step 605). If the device operator indicates that the non-enabled bar code symbologies should be examined, then the enablement processor 507 attempts to characterize the imaged or scanned bar code data according to one or more of the non-enabled bar code symbologies (step 606). In attempting to characterize a set of scanned or imaged bar code data, the enablement processor 507 may, in the case of a linear symbology, compare the start and stop characters of the data with the start and stop characters of each non-enabled bar code symbology. In an alternative embodiment, the enablement processor 507 may skip step 605 and simply proceed with step 606.

If the enablement processor 507 succeeds in characterizing the imaged or scanned bar code data according to one or more non-enabled bar code symbologies, then the enablement processor 507 provides the device operator with a list of the bar code symbologies, if any, which characterize the imaged or scanned bar code data (step 607). The enablement processor 507 then queries the device operator to determine whether the operator wishes any of these bar code symbologies to have an enabled status (step 608). If the device operator indicates one bar code symbology from this list which should be enabled, then the enablement processor 507 changes the status of the bar code symbology to enabled (step 609) and determines the alphanumeric form for the imaged or scanned bar code data according to the newly enabled bar code symbology (step 610).

If the device operator indicates that no presently non-enabled bar code symbology should be enabled or indicates that more than one bar code symbology should be enabled, then the bar code processor 504 generates an error message (step 611). In addition, if the enablement processor 507 cannot characterize the imaged or scanned bar code data according to any of the non-enabled bar code symbologies, then the enablement processor 507 generates an error message (step 612).

A specific example of an embodiment of the invention for enabling a non-enabled bar code symbology is as follows. The bar code reader 502 images or scans a bar code label encoded in a Code 39 bar code symbology and transmits the imaged or scanned bar code data to a bar code processor 504 in the hand-held device 501. The bar code processor 504 examines the enabled bar code symbologies resident in the memory of the hand-held device to identify the bar code symbology in which the imaged or scanned bar code data has been encoded. The bar code processor 504 cannot locate a bar code symbology among the enabled bar code symbologies in which the bar code data could have been encoded and signals an enablement processor 507 to examine the non-enabled bar code symbologies resident in the hand-held device's memory 505. The enablement processor 507 determines that the bar code data could have been properly encoded in the Code 39 bar code symbology, which presently has a non-enabled status in the hand-held device's memory. Since Code 39 is a linear symbology, the enablement processor 507 identifies the imaged or scanned data as having been encoded in Code 39 by comparison of the start and stop characters. The enablement processor 507 generates a message to the device operator that the bar code data cannot be characterized according to any of the enabled bar code symbologies but could be characterized in the Code 39 bar code symbology which presently has a non-enabled status in this hand-held device 501.

The enablement processor 507 next queries the device operator whether Code 39 should be enabled on this hand-held device 501. If the device operator replies that Code 39 should not be enabled, then the enablement processor 507 signals the bar code processor 504 to send an error message to the device operator that the bar code data could not be identified. If the device operator replies that Code 39 should be enabled, then the enablement processor 507 signals the hand-held device 501 to enable Code 39. Once Code 39 has been enabled on the hand-held device, then the bar code processor 504 characterizes the imaged or scanned bar code data according to the Code 39 symbology and determines its corresponding alphanumeric form.

FIGS. 7A, 7B, and 7C depict user interface screens applicable for guiding a device operator through the process of enabling a non-enabled bar code symbology. In the embodiment shown in FIG. 7A, the exemplary user interface screen informs the device operator that the input data, from an imaging or scanning procedure, cannot be identified according to an enabled bar code symbology. The user interface then tells the device operator that the input data could be identified according to a particular non-enabled bar code symbology ("Code 39" here) on the hand-held device 501 and provides the device operator with the option of enabling this non-enabled bar code symbology. In the alternative embodiment shown in FIG. 7B, the exemplary user interface informs the device operator that the input data cannot be identified according to an enabled bar code symbology and then asks the device operator whether non-enabled symbologies should be examined. If the device operator provides an affirmative reply, then the user interface produces a screen such as that shown in FIG. 7C. Using the screen shown in FIG. 7C, the device operator may direct the hand-held device 501 to examine non-enabled bar code symbologies present in the device 501 and may also direct the hand-held device 501 to examine symbologies externally located from the device 501. In both of these options, if the enablement processor 507 finds a suitable non-enabled bar code symbology, then the device operator will be presented with a screen such as that shown in FIG. 7A.

In an alternative embodiment of the invention, the device operator may be first informed that the imaged or scanned bar code data cannot be characterized according to an enabled bar code symbology and then asked whether the device operator wishes an examination undertaken to determine if the imaged or scanned bar code data could be characterized according to a non-enabled bar code symbology. The non-enabled bar code symbologies will only be examined when the device operator sends an affirmative reply.

In yet another embodiment of the invention, the enablement processor 507 may include an enablement timer. The enablement timer allows the device operator to enable a bar code symbology for a limited amount of time before the symbology either becomes non-enabled or before the enablement processor 507 queries the device operator whether the bar code symbology should remain enabled. The timer may be implemented with default values which may also be adjusted by the device operator. Thus, if a device operator and his hand-held device were temporarily transferred to an area using a different bar code symbology than normally used by the device operator, the device operator could use the enablement timer to temporarily re-set the enabled bar code symbologies on the device 501, freeing the device operator from having to remember to re-set the normal symbologies on the device when it returns from the temporary assignment.

The device 501 may encounter data from automatic data collection (ADC) devices other than other than bar code readers. Other ADC devices may access data from radio frequency ("RF") tags, magnetic stripes, optical character recognition ("OCR") systems, SmartCards, and speech input. Some of the other forms of ADC data are proprietary so that one ADC data tag may only be read by a reading device produced by or licensed from the same entity that produced the tag. However, the problem identified with bar code symbologies arises even with proprietary ADC data due to various ADC data versions or ADC data types. For example, a given proprietor's RF tag may have four different versions. If the proprietor's reading device only has one of these versions enabled but reads an RF tag encoded in one of the other versions, then an incorrect read will result. This problem may be corrected by enabling the non-enabled RF tag version on the hand-held device of the invention. OCR data and voice data may contain header information which varies from one equipment type to another. If the hand-held device does not have the proper header type enabled, then an error will result. Therefore, embodiments of the invention provide notification to a device operator regarding enablement of ADC data types in general and is not limited to bar code symbologies. An exemplary RF tag reader suitable for use in the present invention is described in U.S. application Ser. No. 09/067,339, entitled, "Automatic Mode Detection and Conversion System for Printers and Tag Interrogators," filed on Apr. 27, 1998 and assigned to a common assignee, which is hereby incorporated by reference.

Figure 8:
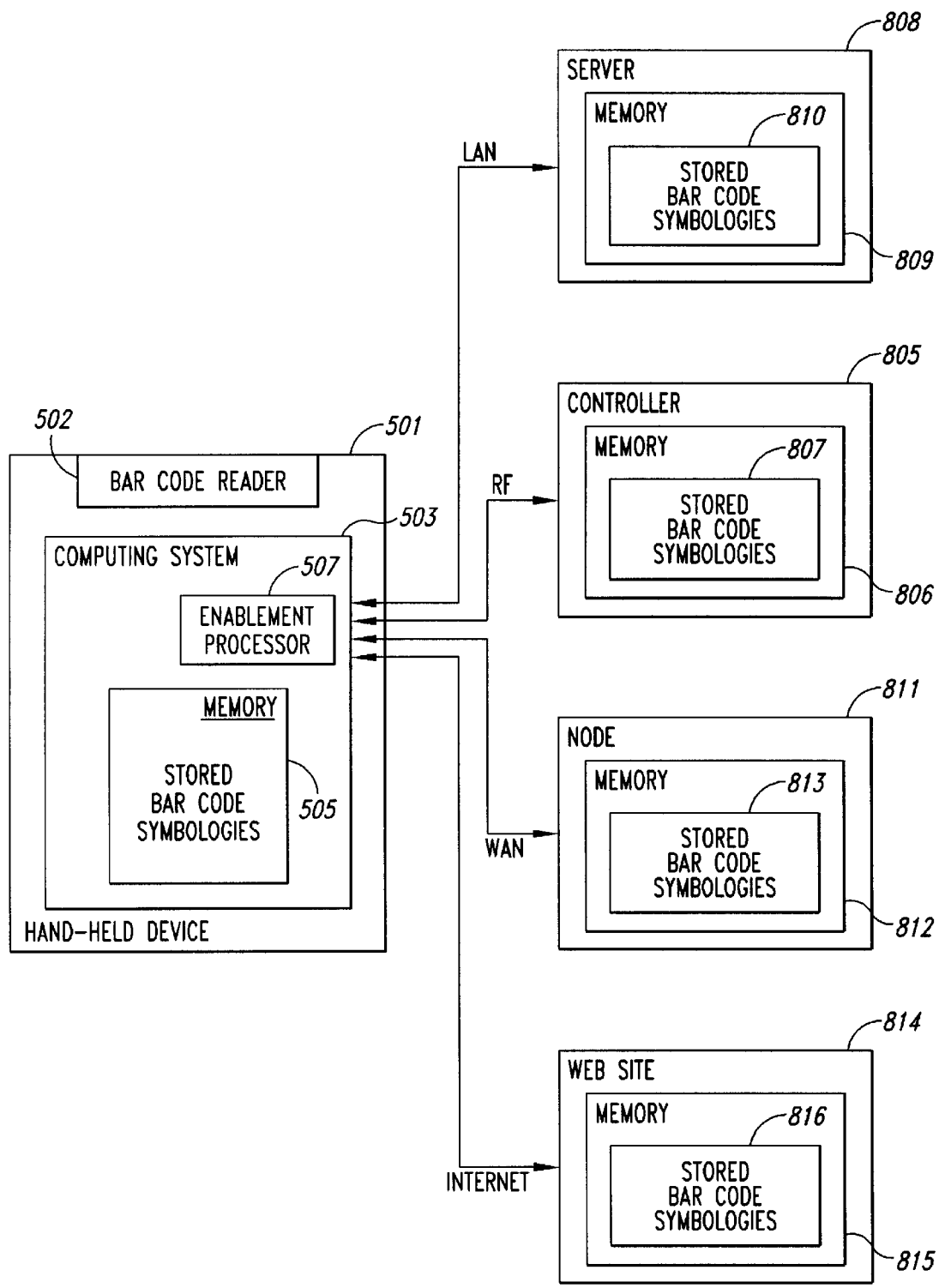
FIG. 8 provides a block diagram of an alternative embodiment of the invention.

FIG. 8 displays yet another alternative embodiment of the invention. In this embodiment, the enablement processor 507 not only examines the bar code symbologies stored in memory 505 within the computing system 503 of the hand-held device 501, but the enablement processor 507 may also examine bar code symbologies stored externally to the hand-held device 501. In this embodiment of the present invention, the hand-held device 501 is coupled to various external systems via wireless, e.g., RF transmissions or wired, e.g., TCP/IP connections. After determining that imaged or scanned bar code data cannot be characterized according to either enabled or non-enabled bar code symbologies stored in memory 505, the enablement processor 507 queries the device operator as to whether bar code symbologies externally located from hand-held device 501 should be examined in the effort to characterize the imaged or scanned bar code data. Sources of additional bar code symbologies may include a controller unit in a radio frequency network of bar code readers, such as that represented by controller 805. Controller 805 has a memory 806 which contains additional bar code symbologies 807.

In addition, the hand-held device 501 may be connected to a local area network ("LAN") connected to a server, such as server 808. Server 808 has a memory 809 in which bar code symbologies 810 have been stored. Furthermore, the hand-held device 501 may be connected in a wide area network ("WAN") having a node, such as node 811. Node 811 has a memory 812 containing additional bar code symbologies 813. Finally, the device operator may wish to query a web site located on the Internet, such as web site 814. The web site 814 contains a memory 815 in which additional bar code symbologies 816 have been stored. Additional bar code symbologies may also be stored on an external medium from the hand-held device 501 such as a disk, PCMCIA card, or ROM in a cartridge. The device operator may insert a disk to load the additional bar code symbology.

This embodiment of the invention supports a device operator's efforts to copy a new bar code symbology into the memory of stored bar code symbologies 505 on a hand-held device 501. For example, a device operator may become aware of a previously unknown bar code symbology, such as a bar code symbology recently created for identifying a particular manufacturer's products. The device operator may not even know the name of the new bar code symbology, but the operator may know that all of the bar code labels which must now be input to the hand-held device 501 have been encoded in this new bar code symbology.

Rather than undertaking a complicated procedure to find the new bar code symbology, the device operator simply images or scans a bar code label encoded in the new bar code symbology then finds an external location having the bar code symbology. For example, the device operator may receive a shipment containing parcels encoded in a previously unknown bar code symbology which is unique to the parcel's manufacturer. The device operator simply images or scans one of the bar code labels, then when the bar code symbology cannot be located on the operator's hand-held device, the device operator enters the name of the manufacturer's web site on the World Wide Web. Once the hand-held device 501 has located the manufacturer's web site, then the device operator finds the location for the manufacturer's bar code symbology. The enablement processor 507 verifies that the imaged or scanned bar code data can be characterized according to this new bar code symbology. The device operator then requests that this bar code symbology be downloaded into the hand-held device's stored bar code symbology memory 505. The hand-held device 501 may now successfully identify bar code labels encoded in this new bar code symbology.

As yet another alternative embodiment, the device operator could copy the new bar code symbology directly into the memory of another hand-held device 501 or copy it to a common location, such as server 808, node 811, or controller 805, so the new bar code symbology will be available to other hand-held devices.

Embodiments of the invention also permit the enablement of any operator-selectable input and output devices on a hand-held device. These operator-selectable input and output devices do not necessarily have any relationship with the bar code reader 502 which may be found on the hand-held device 501. For the reasons previously discussed, a typical device operator may not be aware that a particular input device even exists or that it may be enabled by the operator. In addition, the device operator also may not know which input devices on the hand-held device 501 have been non-enabled or enabled, or the degree of enablement for input devices having multiple settings.

Figure 9:
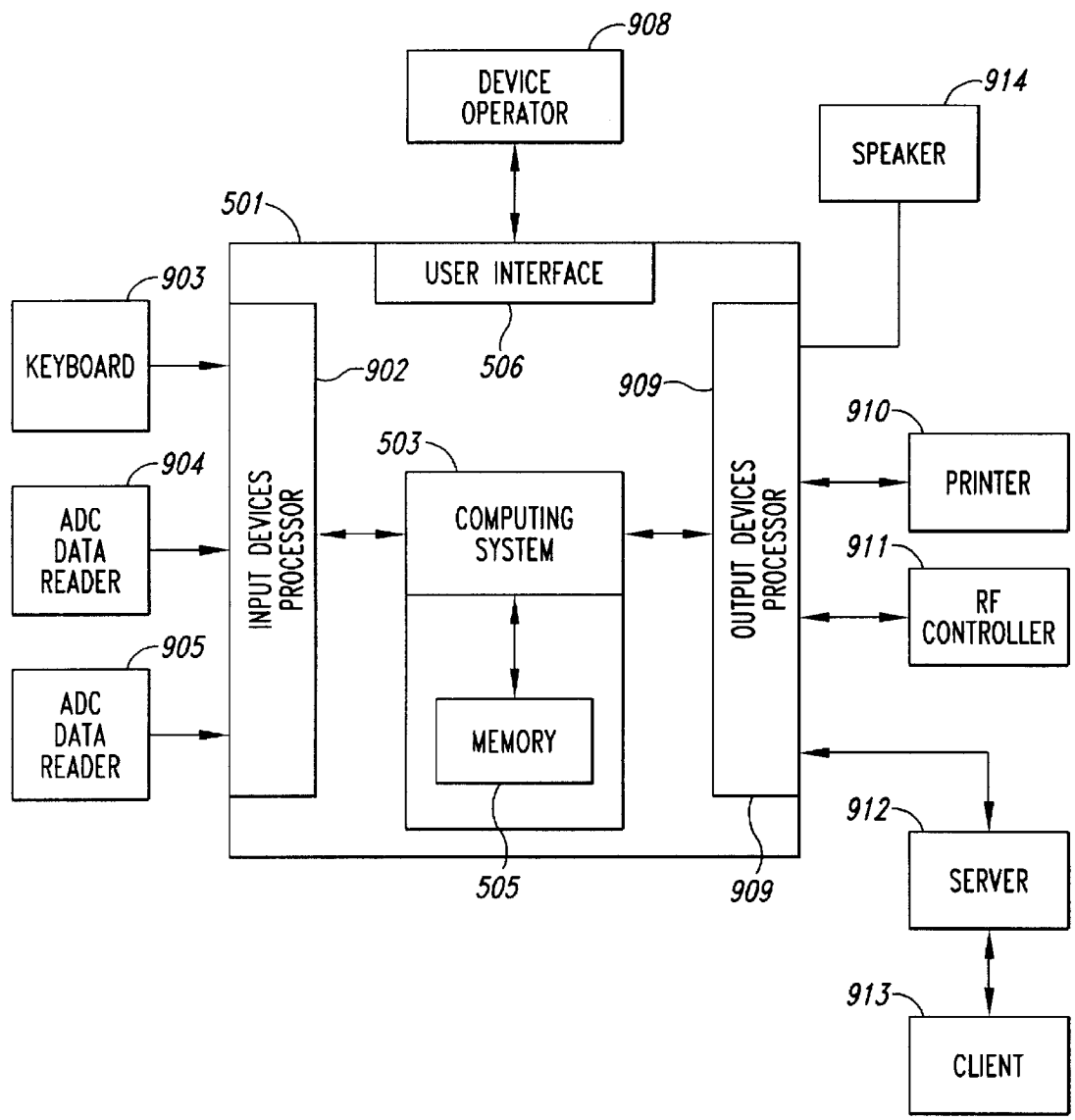
FIG. 9 depicts an operating environment for the hand-held device 501 in accordance with an embodiment of the invention.

FIG. 9 depicts an operating environment for the hand-held device 501 in accordance with an embodiment of the invention. The hand-held device 501 contains an input devices processor 902, a computing system 503, a memory device 505, a user interface 506, and an output devices processor 909. The input devices processor 902 receives input data from external devices attached to the hand-held device 501, such as a keyboard 903 and ADC data readers 904 and 905. The hand-held device 501 may include more than one ADC data reader, such as the ADCdata readers 904 and 905. The hand-held device may include one, two, or even more than two ADCdata readers. As previously mentioned, ADC data readers include bar code readers, RF tag readers, magnetic stripe readers, SmartCards, OCR recognition systems, and speech input recognizers. The ADC data readers 904 and 905 may concurrently provide imaged or scanned data to the hand-held device 501 for processing. The external devices 903, 904, and 905 typically provide raw data input to the hand-held device 501 for processing elsewhere. The input devices processor 902 provides the input data to the computer system 503 which may save the input data in the memory device 505. The computer system 503 may provide status information to a device operator 908 through the user interface 506. The device operator 908 replies to status information presented by the user interface 506 using one or more input devices, such as the keyboard 903. The computing system 503 may also provide input data to the output devices processor 909 for output to devices connected to the hand-held device 501. Output devices typically connected to the hand-held device 501 typically include a printer 910, a speaker 914, an RF controller 911, and a server 912. The server may be connected to other systems, such as a client 913.

Figure 10:
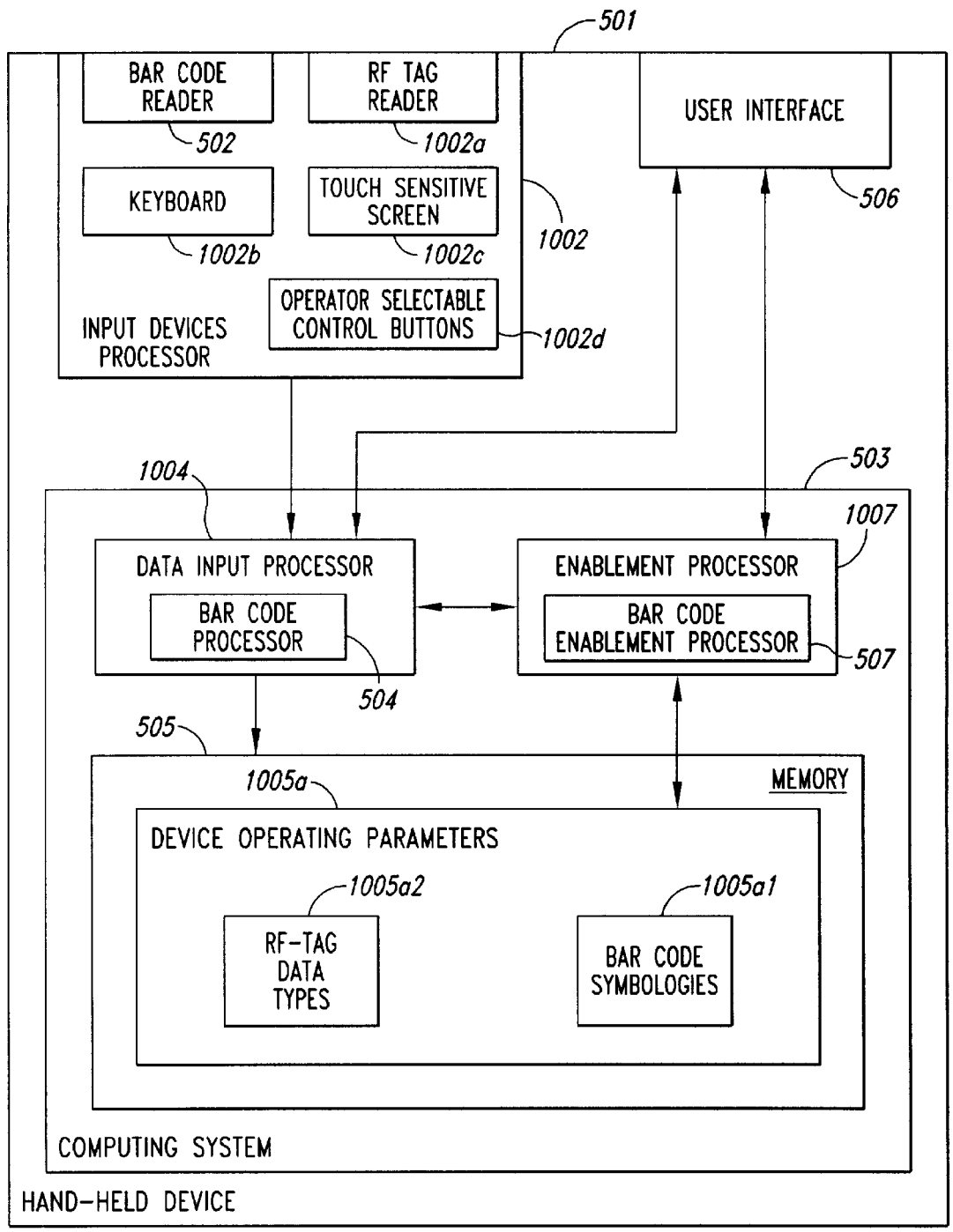
FIG. 10 provides an alternative embodiment of the invention in which an input device enablement processor determines whether a device operator desires the enablement of a presently non-enabled input device based upon the device operator's attempt to access a presently non-enabled input device.

FIG. 10 provides an embodiment of the invention in which an enablement processor 1007 determines whether a device operator desires the enablement of a presently non-enabled input device based upon the device operator's attempt to access a presently non-enabled input device.

Hand-held device 501, as shown in FIG. 10, comprises a variety of input devices 1002, a hand-held device computing system 503, and a user interface 506. The hand-held device computing system 503 includes a data input processor 1004, a memory 505, and the enablement processor 1007.

In this exemplary embodiment, input devices 1002 includes a bar code reader 502, which operates in the manner previously discussed. The input devices 1002 may also include an RF tag reader 1002*a*, a keyboard 1002*b*, a touch sensitive screen 1002*c*, various operator selectable control buttons 1002d, as well as other input devices. As discussed above, the hand-held device may concurrently receive data from more than one ADC data reader, such as the bar code reader 502 and the RF tag reader 1002*a*. The data input processor 1004 contains a bar code processor 504 which operates in a manner similar to that of the bar code processor discussed previously. The RF tag reader 1002*a* likewise operates in a manner according to that previously described for ADC data readers. The data input processor 1004 also performs operations indicated by the device operator's selection of other input devices 1002, such as operations indicated by selection of various keys of keyboard 1002*b*. In processing the various inputs to the hand-held device, the data input processor 1004 typically examines memory 505, which contains the hand-held device's operating parameters 1005*a*. Various hand-held device operating parameters have been stored in the device operating parameters memory section 1005*a*, such as the bar code symbologies 1005*a*1 and the RF tag data types 1005*a*2. In addition, the device operating parameters memory section 1005*a* also stores the present state and settings of the other hand-held input and output devices. For example, if the hand-held device contains a touch-sensitive screen, such as 1002*c*, then the present status of the touch-sensitive screen 1002*c* would be stored in the device operating parameters 1005*a*. In other words, if the hand-held device 501 has a touch-sensitive screen which could be enabled or disabled by a device operator-selectable parameter, then device operating parameters memory section 1005*a* holds this parameter information.

When the data input processor 1004 determines that a device operator selected input cannot be performed because the particular input device has not been enabled, then the data input processor signals the enablement processor 1007. The enablement processor 1007 first determines whether an action taken by the device operator could be performed on this hand-held device. For example, the device operator may have pressed a function key on the keyboard 1002*b* which does not actually engage a function on this particular hand-held device. If the enablement processor 1007 determines that the operator-selected action could be performed if the selected input device was enabled, then the enablement processor 1007 queries the device operator, through user interface 506, whether the enablement processor 1007 should enable the selected input device. For example, if the device operator activates the touch-sensitive screen when the touch-sensitive screen 1002*c* has a non-enabled status, then the enablement processor 1007 queries the device operator through the user interface 506 as to whether the device operator wishes to enable this input device. If the device operator indicates that the input device should be enabled, then the enablement processor 1007 updates the appropriate location in the device operating parameters memory section 1005*a* and then signals the data input processor 1004 to perform the requested action. On the other hand, if the device operator indicates that the input device should remain non-enabled, then the enablement processor 1007 either ignores the operator's previous selection of the input device or generates an error message, as appropriate for the particular input device. The enablement processor 1007 also contains the bar code enablement processor 507, which operates in a manner similar to the previously discussed bar code enablement processor.

Figures 11A, 11B:
FIGS. 11A and 11B provide exemplary user interfaces which may be presented to a device operator regarding enablement of a non-enabled hand-held device parameter.

FIG. 11 provides exemplary user interfaces which may be presented to a device operator in regard to the enablement of a non-enabled hand-held device parameter. FIG. 11 A provides a first sample user interface screen presented to a device operator as the result of the operator's accessing of a non-enabled touch sensitive screen. In this sample screen, the user interface notifies the device operator that the touch sensitive screen is not enabled. The user interface gives the device operator the option of enabling the touch sensitive screen. FIG. 11B provides a second exemplary user interface screen provided when the device operator chooses to enable a non-enabled parameter, such as a touch sensitive screen. This user interface screen provides the device operator with a default value for the pressure-sensing setting of the touch sensitive screen, allowing the device operator to set the default value to a lighter or heavier value by repeatedly pressing on either the "L" or "H" key on the hand-held device's keyboard. The present sensitivity setting of the touch sensitive screen is shown in a bar form. When the device operator has finished selecting the settings for the touch sensitive screen, the device operator concludes the procedure by pressing the "D" key on the keyboard.

Figure 12:
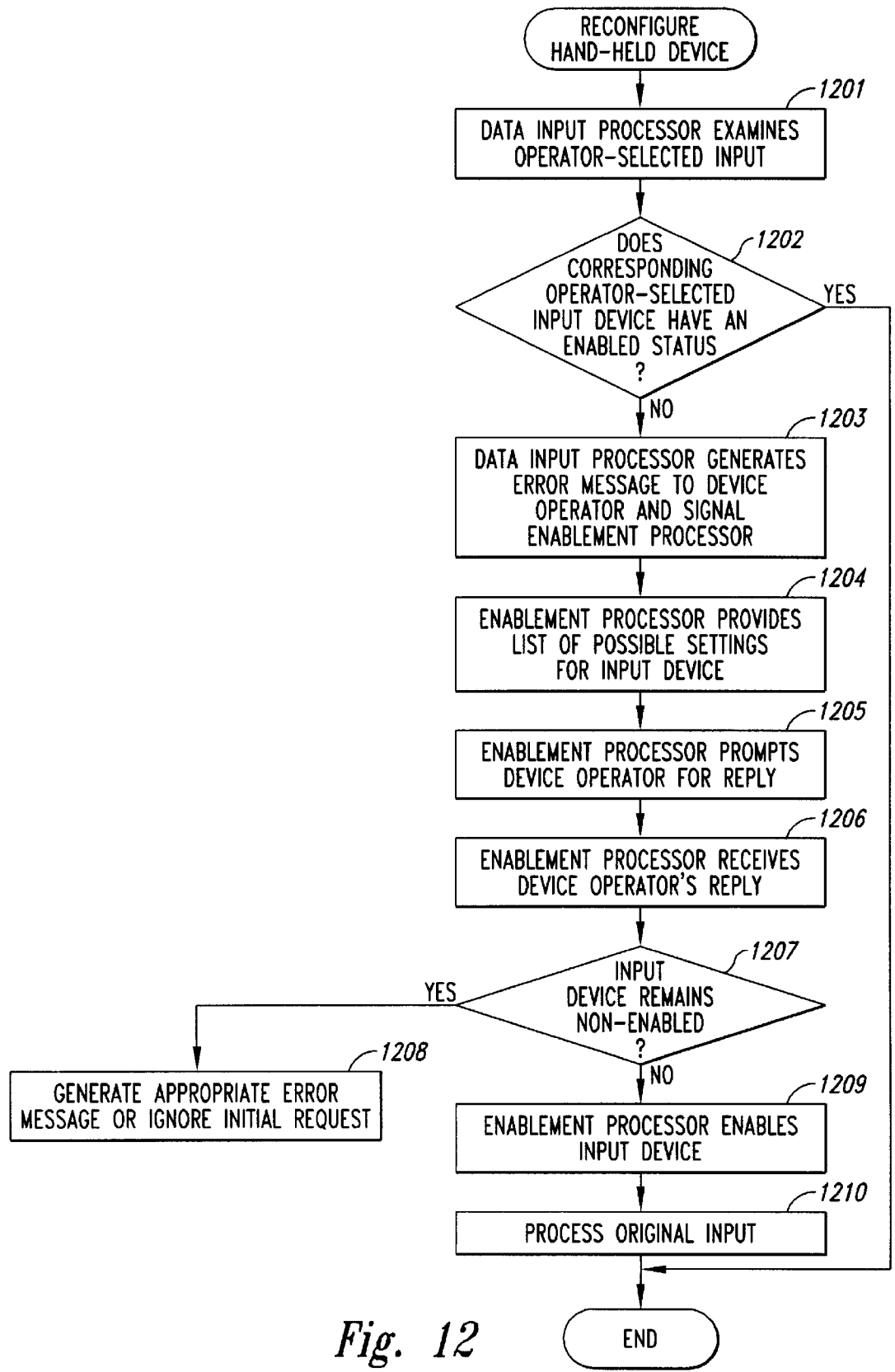
FIG. 12 provides a flow diagram for reconfiguring a hand-held device, according to an exemplary embodiment of the invention.

FIG. 12 provides a flow diagram for reconfiguring a hand-held device, according to an exemplary embodiment of the invention. A data input processor 1004 examines a device operator selected input (step 1201). The data input processor 1004 attempts to perform the function indicated by the operator-selected input by first examining the input device parameters stored in the hand held device's memory 505 to determine if the particular operator selected input device has an enabled status (step 1202).

If the input device parameters stored in the hand-held device's memory 505 indicate that the operator selected input device has not been enabled on the hand-held device 501, then the data input processor 1004 generates an error message to the device operator which states that the operator-selected input device has not been enabled and sends an indication signal to the enablement processor 1007 (step 1203). The enablement processor 1007 then presents the device operator with a list of possible settings for the operator selected input device (step 1204). The enablement processor 1007 then prompts the device operator to select one of the possible settings for the operator selected input device (step 1205). The enablement processor includes the option of retaining the non-enabled status for the operator selected input device.

The enablement processor 1007 receives the device operator's selection from the list of possible settings for the operator-selected input device (step 1206). If the device operator requests that the operator-selected input device remain non-enabled (step 1207), then the data input processor either ignores the operator's initial selection of the device or generates an error message, as appropriate depending on the particular input device (step 1208). If the device operator responds that the operator-selected input device should be enabled, then the enablement processor 1007 enables the input device at the level selected by the device operator (step 1209). For example, an input device might be enabled at a low, medium, or high level. The data input processor then processes the device operator's selected input as if the input device had been enabled when initially selected (step 1210).

In an alternative embodiment of the invention, the enablement processor 1007 provides the device operator with an option for re-setting input device parameters other than, or in addition to, the parameters of the operator-selected input device which triggered the activation of the enablement processor 1007. For example, the device operator may access a particular key stroke sequence which would perform a valid, non-enabled function on the hand-held device 501. The enablement processor 1007 may also be aware that this particular non-enabled function is rather uncommon and that the operator-selected key stroke sequence resembles a more commonly accessed key stroke sequence. If the device represented by the more commonly accessed key stroke sequence is also non-enabled, the enablement processor 1007 may provide the device operator with the option of enabling both the device represented by the specific key stroke sequence entered and the device represented by the more common key stroke sequence. Likewise, the enablement processor 1007 may also present other enablement options for the device operator to consider when a non-enabled device parameter has been accessed.

In an alternative embodiment of the invention, the hand-held device 501 also contains an operator-selectable mechanism which allows the device operator to enable or non-enable the system for guiding the device operator through the enablement of input device parameters, including the sub-system for examining non-enabled bar code symbologies.

Embodiments of the invention are applicable to output devices, such as the printer 910 and the speaker 914 as shown in FIG. 9. For example, the speaker 914 may be presently disabled, but the computing system 503 may make the enablement processor 1007 aware of the need to send a warning. The enablement processor 1007 queries the device operator whether the speaker 914 should continue to remain muted. Using a timer, such as the previously discussed timer, the enablement processor 1007 may repeat the query to the device operator at various intervals. The enablement processor 1007 may perform similar functions with regard to other output devices, such as printer 910, RF controller 911, and server 912. For example, the hand-held device 501 may be presently disconnected from the RF controller 911 but the device operator 908 continues to provide new input data through input devices processor 902 which is stored in memory 503 while waiting to be delivered to RF controller 911. The enablement processor 1007 becomes aware that the memory 503 is filling with input data and informs the device operator 908 that because the hand-held device 501 is not connected with RF controller 911 the memory device 503 is filling with input data. The enablement processor 1007 then queries the device operator 908 to determine whether connection with RF controller 911 should be performed to upload the data and thereby free up space in the memory device 503.

In yet another embodiment of the invention, the enablement processor 1007 may notify the device operator 908 of the status of parameters related to external devices. For example, the hand-held device 501 may be expecting communication feedback from the client 913 through the server 912. When this feedback does not occur within a predetermined interval, the enablement processor 1007 informs the device operator 908 that the hand-held device 501 is not receiving the expected communication feedback from the remote device 913. The enablement processor 1007 then queries the device operator 908 to ask if explicit steps should be taken to re-establish communication. The enablement processor 1007 may be operative with regard to any number of system parameters and even application parameters. In such an embodiment, the enablement processor 1007 may serve as a back-up, or confirmation, of similar messages produced by an application or an operating system. For example, an application may have a capacity for informing the device operator 908 of problems with an external device such as the printer 910. The application first informs the device operator 908 that the printer 910 is not responding, then the enablement processor 1007 also provides notice to the device operator 908 which confirms the notice produced by the application.

The hand-held device of the invention may be applied in connection with systems and methods for more accurate bar code scanning. Such a system is more clearly described in a patent application entitled "Method for Decoding Bar Code Symbols by Declaring Erasures of Element Widths Based on Soft Decision of Measured Widths," filed on Jan. 14, 1998, and assigned to a common assignee, which is hereby incorporated by reference.

The hand-held device of the invention may also be applied in conjunction with improved scanning devices and procedures. One applicable approach is more clearly described in a patent application entitled "Method of Auto-discriminating in Symbology Reader Employing Prioritized and Updated Table of Symbologies," filed on Jan. 14, 1998, and assigned to a common assignee, which is hereby incorporated by reference.

Although specific embodiments of, and examples for, the invention are described herein for illustrative purposes, various equivalent modifications are possible within the scope of the invention, as will be recognized by those skilled in the relevant art. The teachings provided herein of the invention can be applied to other automatic data collection systems, not necessarily the exemplary hand-held device having a bar code reader described above. Various exemplary automatic data collection data type enablement systems, and accordingly, various other device input and output enablement systems can be employed under the invention.

Aspects of the invention can be applied to not only reading ADC data and other images, but also to transmitting such images to external devices, such as computerized servers and printers. For example, in an alternative embodiment, the invention can aid a device operator in determining that some aspect of an external connection between the hand-held device and a remote server has failed or is not enabled. Thus, the invention finds broad applicability in aiding and instructing a device operator in performing virtually any non-enabled operations which may be performed with a hand-held device, a data collection terminal, and an automatic data collection data type scanning, imaging, or accessing system.

The embodiments of the invention disclosed hereinabove have been discussed with regard to hand-held devices, such as hand-held data collection terminals. However, the invention finds equal applicability in stationary data collection terminals, such as those which may be remotely operated, and desktop personal computers.

All of the above U.S. patents and applications are incorporated herein by reference as if set forth in their entirety. While the invention focuses on bar code symbologies, the invention can similarly read visual indicia of other stored images.

These and other changes can be made to the invention in light of the above detailed description. In general, in the following claims, the terms used should not be construed to limit the invention to the specific embodiments disclosed in the specification and the claims, but should be construed to include all hand-held devices, data collection terminals, and automatic data collection data type imaging systems that operate under the claims to provide a method for guiding a device operator through the process of altering the present state of any operator-selectable feature on such devices. Accordingly, the invention is not limited by the disclosure, but instead its scope is to be determined entirely by the following claims.

What is claimed is:

1. A method for guiding a device operator through the process of enabling a bar code symbology on a hand-held device having a bar code reader, the hand-held device having a plurality of bar code symbologies, the method comprising:

reading a bar code label;

automatically identifying a bar code symbology in which the bar code label has been expressed by, for each of the plurality of bar code symbologies that have an enabled status, determining if the bar code label has been expressed in that bar code symbology; and for each of at least one bar code symbology that has a non-enabled status, determining if the bar code label has been expressed in that bar code symbology; and if the identified bar code symbology has a non-enabled status, then providing the device operator a query asking whether the identified bar code symbology should have an enabled status in the hand-held device; and receiving a reply to the query from the device operator.

2. The method recited in claim 1, further comprising setting the identified bar code symbology to an enabled status in the hand-held device if the reply from the device operator is affirmative.

3. The method recited in claim 1, further comprising generating an error message if the reply from the device operator is negative.

4. The method recited in claim 1, further comprising determining an alphanumeric representation of the bar code label according to the identified bar code symbology after setting the identified bar code symbology to an enabled status.

5. The method recited in claim 1 wherein the step of identifying the bar code symbology in which the bar code label has been expressed includes examining bar code symbologies stored externally from the hand-held device.

6. The method recited in claim 1, further comprising copying an externally stored bar code symbology to the hand-held device.

7. The method recited in claim 1 wherein the step of identifying the bar code symbology in which the bar code label has been expressed includes examining bar code symbologies stored in a file server.

8. The method recited in claim 1 wherein the step of identifying the bar code symbology in which the bar code label has been expressed includes examining bar code symbologies stored in a web site accessible through a telecommunications network.

9. The method recited in claim 1, wherein if the identified bar code symbology is not located on the hand-held device, then providing the device operator a query asking whether the identified bar code symbology should be retrieved from an external location.

10. The method of claim 1 wherein the determining if the bar code label has been expressed in a bar code symbology having a non-enabled status is performed only if it is determined that the bar code label has not been expressed in a bar code symbology having an enabled status.

11. A system for aiding a device operator through the process of enabling a non-enabled automatic data collection data type on a hand-held device having an automatic data collection reader, comprising:

an automatic data collection data type processor which receives imaged or scanned automatic data collection data from the automatic data collection data reader and determines whether the imaged or scanned automatic data collection data can be characterized according to an enabled automatic data collection data type on the hand-held device, wherein the automatic data collection data type processor generates an indication signal if the imaged or scanned automatic data collection data cannot be characterized; and an enablement processor which receives the indication signal from the automatic data collection data type processor and determines if the imaged or scanned automatic data collection data could be characterized according to a non-enabled automatic data collection data type on the hand-held device, wherein if the enablement processor determines that a non-enabled automatic data collection data type characterizes the imaged or scanned automatic data collection data, then the enablement processor sends a query to the device operator to determine if the non-enabled automatic data collection data type should be enabled on the hand-held device.

12. The system recited in claim 11 wherein the enablement processor enables the non-enabled automatic data collection data type if the device operator sends an affirmative response to the query.

13. The system recited in claim 11, further comprising a user interface which receives the query from the enablement processor and presents the query to the device operator.

14. The system recited in claim 11 wherein a user interface receives the indication signal from the automatic data collection data type processor and presents an error message to the device operator.

15. The system recited in claim 11 wherein the hand-held device contains more than one non-enabled automatic data collection data type and the enablement processor examines all the non-enabled automatic data collection data types to determine if one or more of the non-enabled automatic data collection data types characterizes the imaged or scanned automatic data collection data.

16. The system recited in claim 11 wherein if more than one non-enabled automatic data collection data types characterize the imaged or scanned automatic data collection data, then the enablement processor provides the device operator with a list containing the more than one non-enabled automatic data collection data types and queries the device operator to determine if one automatic data collection data type of the more than one automatic data collection data types should be enabled on the hand-held device.

17. The system recited in claim 11 wherein if the enablement processor cannot characterize the imaged or scanned automatic data collection data according to a non-enabled automatic data collection data type, then the enablement processor sends a query to the device operator to determine whether an externally located automatic data collection data type should be examined.

18. The system recited in claim 11 wherein the device operator may disable the enablement processor.

19. The system recited in claim 11 wherein the enablement processor includes a timer which allows the device operator to limit a time period for enablement of the non-enabled automatic data collection data type.

20. The system recited in claim 11 wherein the hand-held device has another automatic data collection data reader and the automatic data collection data type processor may process automatic data collection data from both the automatic data collection data reader and the another automatic data collection data reader.

21. A method for guiding a device operator through the process of enabling an automatic data collection data type on a device for reading automatic data collection data, comprising:

receiving data from the device for reading automatic data collection data and identifying an automatic data collection data type from which the automatic data collection data was encoded;

detecting that the automatic data collection data type has not been enabled on the reader and generating a query to the device operator asking if the automatic data collection data type should be enabled on the reader; and receiving a reply to the query from the device operator.

22. The method recited in claim 21 wherein the automatic data collection data is a remotely readable tag.

23. The method recited in claim 21 wherein if the reply from the device operator is affirmative, enabling the automatic data collection data type on the device.

24. The method recited in claim 21 wherein the step of identifying an automatic data collection data type which characterizes the automatic data collection data comprises examining enabled automatic data collection data types on the hand-held device, and if the automatic data collection data cannot be identified according to an enabled automatic data collection data type, then examining the non-enabled automatic data collection data types on the hand-held device.

25. The method recited in claim 21 wherein if the automatic data collection data cannot be identified according to a non-enabled automatic data collection data type, then querying the device operator as to whether automatic data collection data types stored externally to the hand-held device should be examined.

26. The method recited in claim 21 wherein if the automatic data collection data can be identified according to an automatic data collection data type stored externally, then querying the device operator as to whether the automatic data collection data type should be stored in the hand-held device.

27. The method recited in claim 21 wherein if the automatic data collection data cannot be identified according to a non-enabled automatic data collection data type, then querying the device operator as to whether automatic data collection data types stored in a local area network external to the hand-held device should be examined.

28. The method recited in claim 21 wherein if the automatic data collection data type cannot be identified according to a non-enabled automatic data collection data type, then querying the device operator as to whether automatic data collection data types available through a telecommunications network external to the hand-held device should be examined.

29. A method for aiding a device operator in the enablement of a non-enabled parameter on a hand-held device, comprising:

detecting an attempt to access the non-enabled parameter by the device operator;

generating an error message and sending the error message to the device operator, wherein the error messages states that the non-enabled parameter has not been enabled so the attempt to access the non-enabled parameter cannot be processed by the hand-held device;

querying the device operator whether the non-enabled parameter should be enabled; and receiving a reply from the device operator.

30. The method recited in claim 29 wherein if the reply from the device operator is affirmative then enabling the non-enabled parameter.

31. The method recited in claim 29 wherein the non-enabled parameter represents a touch-sensitive screen.

32. The method recited in claim 29 wherein the non-enabled parameter represents a key from a keyboard.

33. The method recited in claim 29 wherein the non-enabled parameter represents a combination of keys on a keyboard.

34. The method recited in claim 29 wherein the non-enabled parameter represents an operator-selectable input button.

35. The method recited in claim 29 wherein the non-enabled parameter represents a bar code reader.

36. The method recited in claim 29, further comprising processing the attempt to access the parameter after enabling the non-enabled parameter.

37. The method recited in claim 29, further comprising enabling a non-enabled parameter other than the non-enabled parameter for which an access attempt was detected.

38. The method recited in claim 29, further including presenting the device operator with a list of non-enabled parameter on the hand-held device.

39. A system for aiding a device operator in the enablement of a non-enabled device on a hand-held device, comprising:

a device processor for receiving an access request for the non-enabled device by the device operator;

a data processor which receives the access request from the device processor and verifies that the non-enabled device has a non-enabled status, wherein the data processor generates and sends an error message to the device operator which states that the access request is for a non-enabled device; and a device enablement processor which sends a query to the device operator asking whether the non-enabled device should have an enabled status, wherein the device enablement processor receives a reply from the device operator in response to the query.

40. The system recited in claim 39 wherein if the reply is affirmative, the device enablement processor enables the non-enabled device.

41. The system recited in claim 39 wherein the non-enabled device is a touch-sensitive screen.

42. The system recited in claim 39 wherein the non-enabled device is a key from a keyboard.

43. The system recited in claim 39 wherein the non-enabled device is a combination of keys on a keyboard.

44. The system recited in claim 39 wherein the non-enabled device is an operator-selectable input button.

45. The system recited in claim 39 wherein the non-enabled device is a bar code reader.

46. The system recited in claim 39 wherein the device enablement processor, after enabling the non-enabled device, signals the data processor to process the access request for the device.

47. The system recited in claim 39 wherein the device enablement processor permits the enablement of non-enabled devices other than the non-enabled device for which an access request has been received.

48. The system recited in claim 39 wherein the device enablement processor presents the device operator with a list of non-enabled devices on the hand-held device.

49. The system recited in claim 39 wherein the device operator may disable the device enablement processor.

50. The system recited in claim 39 wherein the device enablement processor includes a timer which allows the device operator to limit a time period for enablement of the non-enabled device.

51. The system recited in claim 39 wherein the hand-held device has another non-enabled device and the device processor may receive access requests from the non-enabled device and the another non-enabled device.

52. A method for aiding a device operator in the enablement of a pre-existing non-enabled functionality on a hand-held device, comprising:

monitoring hand-held device input and output activities to detect attempt to access the pre-existing non-enabled functionality by the device operator;

generating and sending an error message to the device operator;

querying the device operator whether the pre-existing non-enabled functionality should be enabled; and receiving a reply to the query from the device operator.

53. The method recited in claim 52 wherein the error message states that the pre-existing non-enabled functionality has not been enabled so the attempt to access the pre-existing non-enabled functionality cannot be processed.

54. The method recited in claim 52, further comprising comparing the attempt to access the pre-existing non-enabled functionality by the device operator with other pre-existing non-enabled functionality to determine similar pre-existing non-enabled functionality, wherein the error message includes a list of the similar pre-existing non-enabled functionality.

55. The method recited in claim 52 wherein if the reply from the device operator is affirmative then enabling the pre-existing non-enabled functionality.

56. The method recited in claim 52 wherein the pre-existing non-enabled functionality includes a connection to a remote server.

* * * * *